United States Patent
Wu et al.

(10) Patent No.: US 10,670,056 B2
(45) Date of Patent: Jun. 2, 2020

(54) WIDENER

(71) Applicants: Chun-Hsien Wu, Taichung (TW); Gang Chen, Ningbo (CN)

(72) Inventors: Chun-Hsien Wu, Taichung (TW); Gang Chen, Ningbo (CN)

( * ) Notice: Subject to any disclaimer, the term of this patent is extended or adjusted under 35 U.S.C. 154(b) by 66 days.

(21) Appl. No.: 16/109,173

(22) Filed: Aug. 22, 2018

(65) Prior Publication Data

US 2020/0063768 A1 Feb. 27, 2020

(51) Int. Cl.
 *F16B 2/04* (2006.01)
(52) U.S. Cl.
 CPC ...................... *F16B 2/04* (2013.01)
(58) Field of Classification Search
 None
 See application file for complete search history.

(56) References Cited

U.S. PATENT DOCUMENTS

| 2,283,089 | A | * | 5/1942 | Pfauser | B25B 27/00 254/104 |
| 5,398,535 | A | * | 3/1995 | Giffin | B21D 1/08 72/392 |
| 5,465,576 | A | * | 11/1995 | Miller | F15B 1/26 60/478 |

* cited by examiner

*Primary Examiner* — Brian D Keller
(74) *Attorney, Agent, or Firm* — Muncy, Geissler, Olds & Lowe, P.C.

(57) ABSTRACT

A widener is provided, including: a base, a pushing assembly and a driving assembly. The base includes an inner space, a first passage and a second passage which are communicated with one another, and the first passage is transverse to the second passage. The pushing assembly includes a first pushing board, a second pushing board and a linkage member. The first pushing board is positioned at the base. The linkage member is movably inserted within the second passage. The second pushing board comovably connected with the linkage member. The driving assembly includes a tube body, a driving member and a driving block. The tube body defines a driving space, and the driving block is movably received in the driving space. An end of the tube body is connected with the first passage and the driving space is communicated with the inner space.

6 Claims, 5 Drawing Sheets

WIDENER

BACKGROUND OF THE INVENTION

Field of the Invention

The present invention relates to a widener.

Description of the Prior Art

When forcing two spaced objects to move away from each other, an operator usually pulls the two objects by hands if the weight of the two objects is light. If the weight of the two objects is heavy, the operator will insert a tool between the two objects, and one end of the tool is abutted against one of the two objects and a working part of the tool is positionably abutted against the other of the two objects, and then the tool pushes away the two objects by principle of leverage.

However, the method described above is easy to result in abrasion of the two objects and the tool, and a distance between the two objects may not be controlled accurately. In addition, the two objects cannot be moved in parallel, which needs to be improved.

The present invention is, therefore, arisen to obviate or at least mitigate the above-mentioned disadvantages.

SUMMARY OF THE INVENTION

The main object of the present invention is to provide a widener which can stably push two spaced and adjacent objects away from each other, and the two objects are moved in parallel so that a distance between the two objects is controllable accurately and it causes no damage to the two objects.

To achieve the above and other objects, the present invention provides a widener, including: a base, including an inner space, a first passage and a second passage which are communicated with one another, the first passage being transverse to the second passage; a pushing assembly, including a first pushing board, a second pushing board and a linkage member, the first pushing board being positioned at the base, the linkage member being movably inserted within the second passage, the second pushing board being comovably connected with the linkage member, the second pushing board being located opposite to the first pushing board; a driving assembly, including a tube body, a driving member and a driving block, the tube body defining a driving space, the driving block being movably received in the driving space, an end of the tube body being connected with the first passage and the driving space being communicated with the inner space, the driving member being movably screwed to and within another end of the tube body, a pushing end of the driving member being abutted against the driving block in the driving space; wherein the driving block, the first passage, the inner space, the second passage and the linkage member define a flowing space which is configured to receive liquid.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
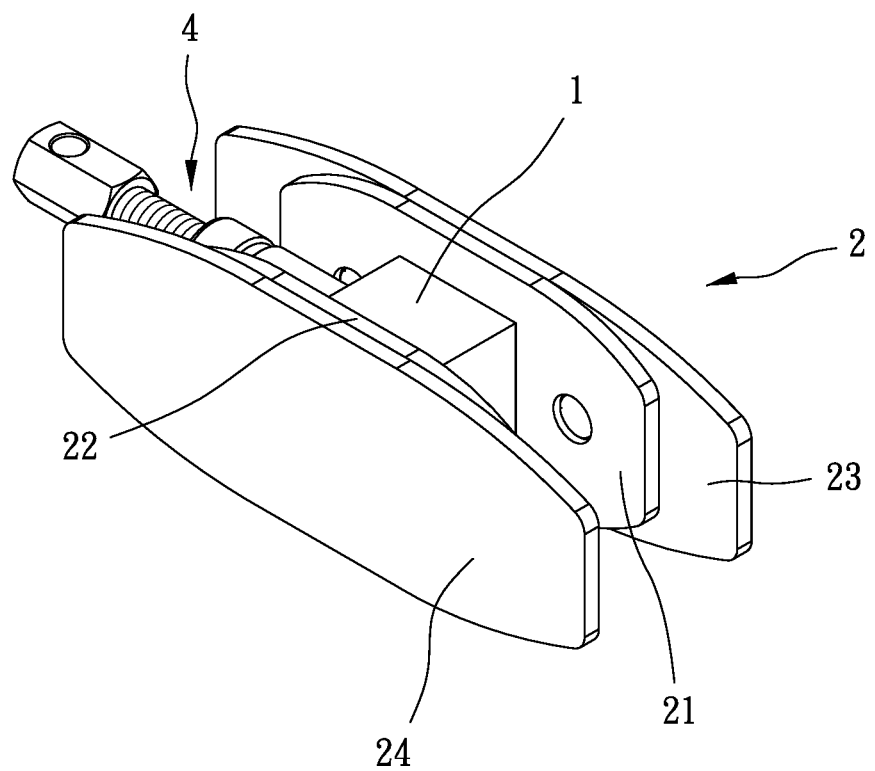
FIG. 1 is a stereogram of a preferable embodiment of the present invention.
Figure 2:
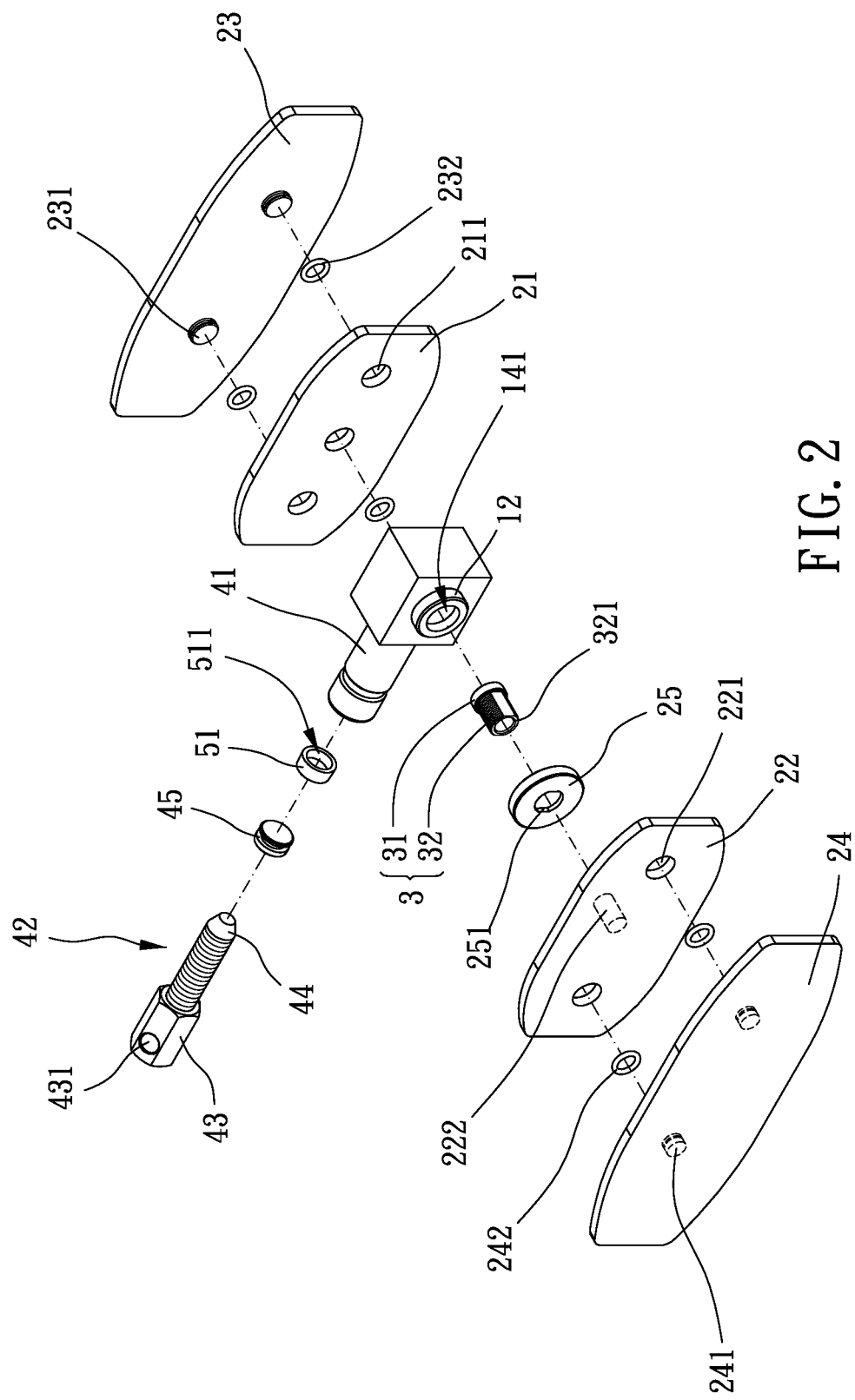
FIG. 2 is a breakdown drawing of FIG. 1.
Figure 3:
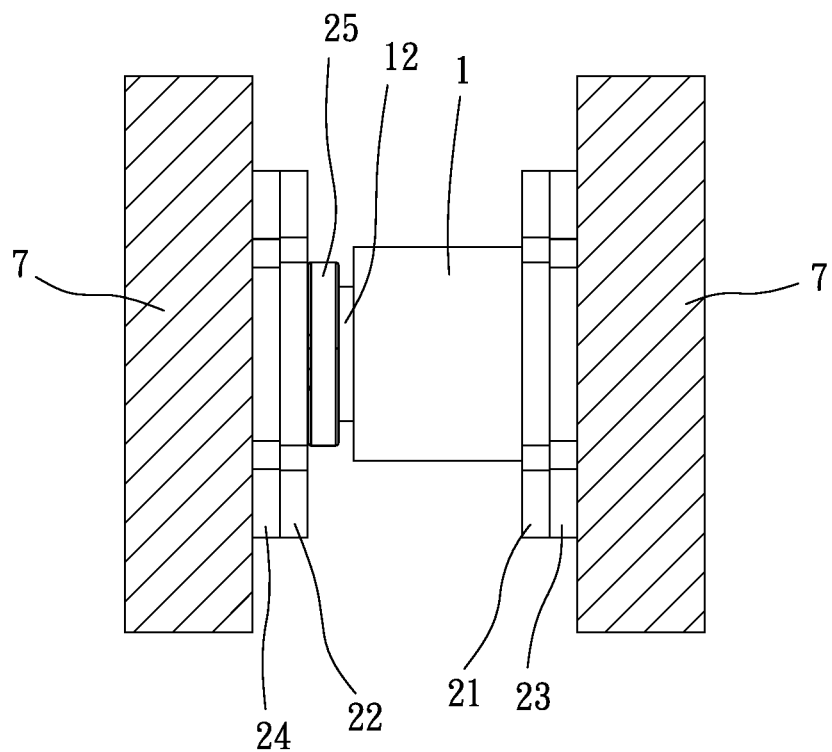
FIGS. 3 and 4 are cross-sectional side views showing operation of a preferable embodiment of the present invention.
Figure 4:
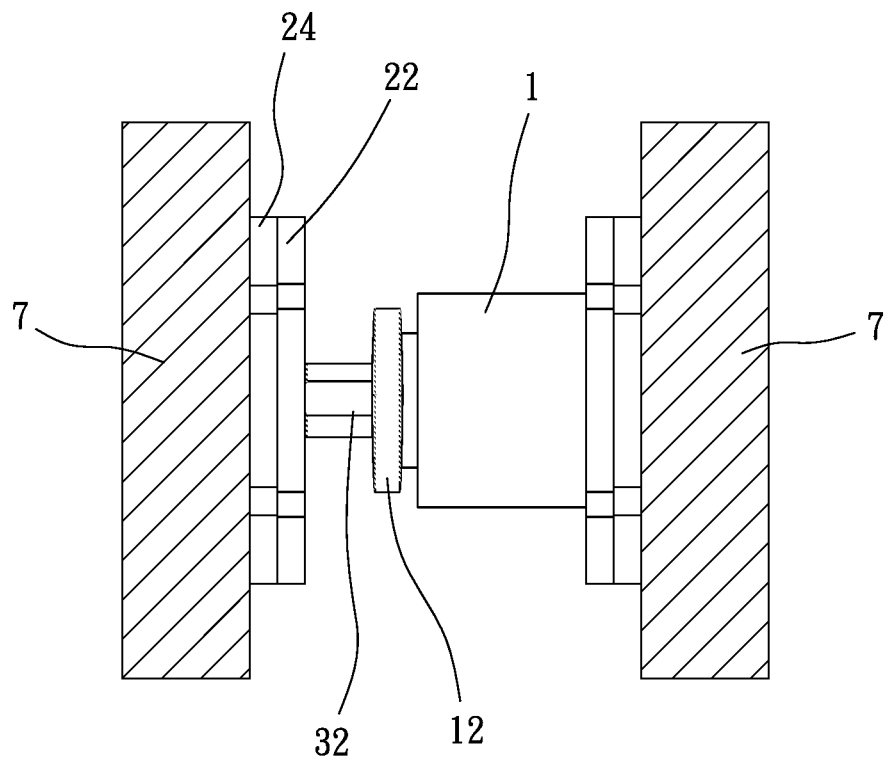
Figure 5:
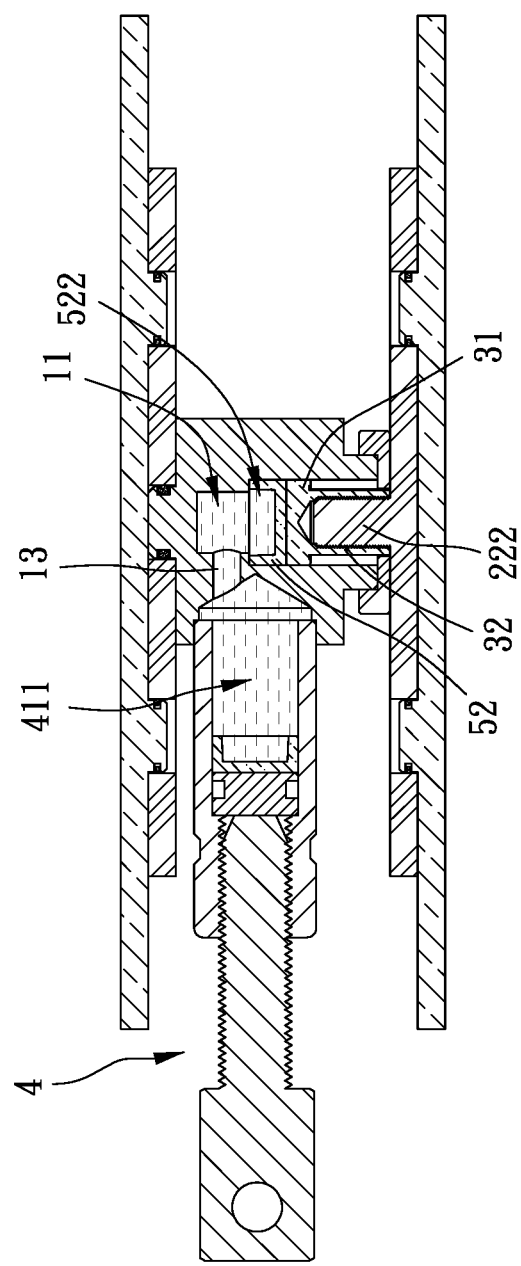
FIGS. 5 and 6 are other cross-sectional side views showing operation of a preferable embodiment of the present invention.
Figure 6:
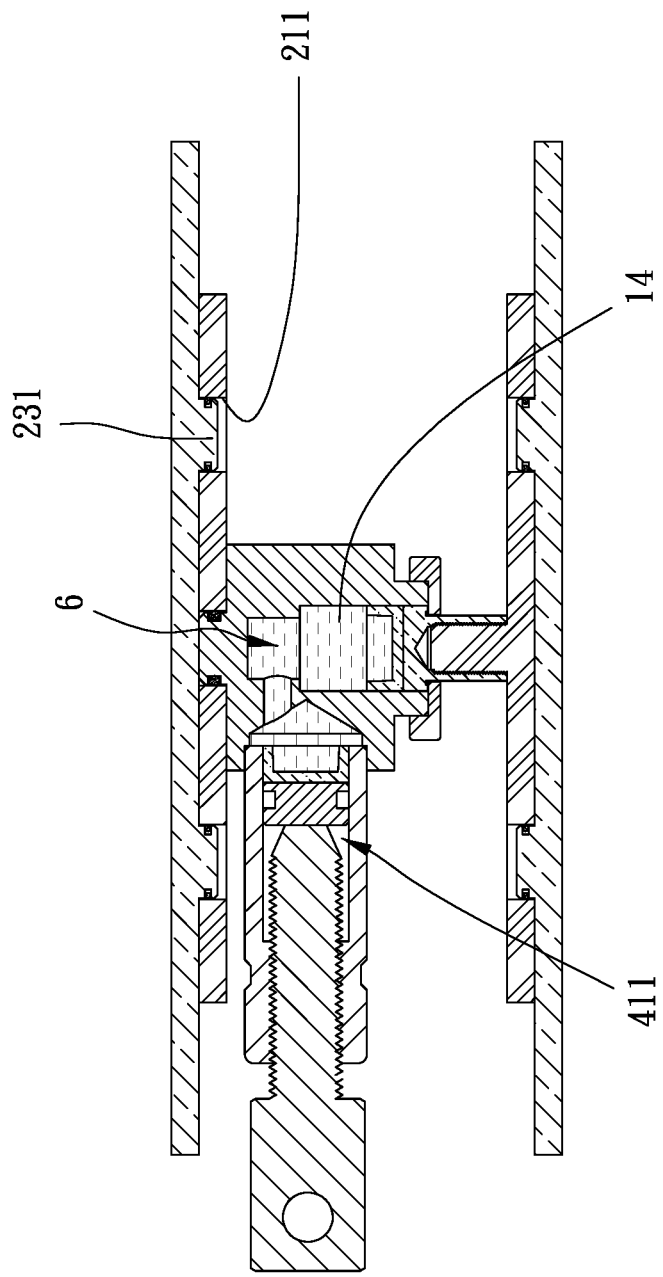

Please refer to FIGS. 1 to 6 for a preferable embodiment of the present invention. A widener of the present invention includes a base 1, a pushing assembly 2 and a driving assembly 4.

The base 1 includes an inner space 11, a first passage 13 and a second passage 14 which are communicated with one another, and the first passage 13 is transverse to the second passage 14. The pushing assembly 2 includes a first pushing board 21, a second pushing board 22 and a linkage member 3. The first pushing board 21 is positioned at the base 1. The linkage member 3 is movably inserted within the second passage 14. The second pushing board 22 is comovably connected with the linkage member 3, and the second pushing board 22 is located opposite to the first pushing board 21. In this embodiment, the linkage member 3 has a threaded hole 321, and the second pushing board 22 includes a screwing portion 222 protruding thereon. The screwing portion 222 is screwed with the threaded hole 321 to connect the second pushing board 22 and the linkage member 3, thus facilitating assembling, disassembling and processing.

Specifically, the driving assembly 4 includes a tube body 41, a driving member 42 and a driving block 45. The tube body 41 defines a driving space 411, and the driving block 45 is movably received in the driving space 411. An end of the tube body 41 is connected with the first passage 13 and the driving space 411 is communicated with the inner space 11. The driving member 42 is movably screwed to or within another end of the tube body 41, and a pushing end 44 of the driving member 42 is abutted against the driving block 45 in the driving space 411.

The driving block 45, the first passage 13, the inner space 11, the second passage 14 and the linkage member 3 define a flowing space 6 which is configured to receive liquid. When the driving member 42 is rotated and forces the driving block 45 to move toward the base 1, the liquid which is uncompressible pushes the linkage member 3 to drive the second pushing board 22 to move away from the base 1, and the second pushing board 22 is moved away from the first pushing board 21. The driving member 42 pushes the driving block 45 by screwing so that a moving distance of the driving block 45 is easy to be controlled, and a distance between the second pushing board 22 and the first pushing board 21 are accurately controllable.

When a distance between the two objects 7 needs to be increased, the pushing assembly 2 is inserted between the two objects 7. The first pushing board 21 is abutted against one of the two objects 7 and the second pushing board 22 is abutted against the other of the two objects 7, and the driving member 42 is rotated so that the two objects 7 are stably pushed away from each other. The widener is usable as long as it can reach between the two objects 7, and the widener is suitable for use in a narrow space.

Preferably, the widener further includes a first mediator 51 and a second mediator 52. The first mediator 51 is disposed on the driving block 45 and the second mediator 52 is disposed on the linkage member 3. The first mediator 51 has a first receiving groove 511, and an opening of the first receiving groove 511 faces the inner space 11. The second mediator 52 has a second receiving groove 522, and an opening of the second receiving groove 522 faces the inner space 11. The first receiving groove 511 and the second receiving groove 522 are configured to receive the liquid. Specifically, the first mediator 51 and the second mediator 52 can uniformly transmit the force generated by the liquid flowing to the driving block 45 and the linkage member 3 respectively so that the driving block 45 and the linkage member 3 can be moved stably.

Preferably, the first pushing board 21 is detachably disposed on the base 1. The first pushing board 21 may be stored singly for saving space when not in use. The first pushing board 21 is detachable and easy to be replaced.

The base 1 is a rectangular cuboid so that the first pushing board 21 and the second pushing board 22 are adjusted to be arranged in parallel and the two objects 7 can be moved in parallel. Moreover, the base 1 has a projection 12. The second passage 14 is disposed through the projection 12 and a first opening 141 with a circular shape is formed. The linkage member 3 has a head portion 31 with a circular shape and a body portion 32 with a non-circular shape. A diametric dimension of the head portion 31 is larger than that of the body portion 32. A caliber of the first opening 141, a diametric dimension of the second passage 14 and the diametric dimension of the head portion 31 are the same. The threaded hole 321 is disposed on the body portion 32.

Moreover, the pushing assembly 2 further includes a restricting member 25 which is positionably sleeved on the projection 12. The restricting member 25 has a second opening 251 with a non-circular shape. A contour of the second opening 251 corresponds to a contour of the body portion 32 and the linkage member 3 is movable along the second passage 14 and non-rotatable relative to the second passage 14. Specifically, a caliber of the second opening 251 is smaller than the caliber of the first opening 141. The restricting member 25 interferes with the head portion 31 in an opening direction of the first opening 141 so that the head portion 31 is restricted in the second passage 14 to prevent the linkage member 3 from detaching from the base 1. In this embodiment, the contour of the second opening 251 is an oval-shaped.

Preferably, the pushing assembly 2 further includes a third pushing board 23 and a fourth pushing board 24. The third pushing board 23 is detachably disposed on the first pushing board 21 and the fourth pushing board 24 is detachably disposed on the second pushing board 22. The operator may add the third pushing board 23 and the fourth pushing board 24 according to various requirements so as to change the contact area or the thickness of the pushing boards to be biased against the two objects 7.

Specifically, the first pushing board 21 has a plurality of first insertion holes 211, and the third pushing board 23 has a plurality of first insertion columns 231. The plurality of first insertion columns 231 are inserted into the plurality of first insertion holes 211 respectively so that the third pushing board 23 is connected to the first pushing board 21. The third pushing board 23 and the first pushing board 21 can be assembled or disassembled rapidly. Similarly, the second pushing board 22 has a plurality of second insertion holes 221, and the fourth pushing board 24 has a plurality of second insertion columns 241. The plurality of second insertion columns 241 are inserted into the plurality of second insertion holes 221 respectively so that the fourth pushing board 24 is connected to the second pushing board 22.

In this embodiment, structures of the first pushing board 21 and the second pushing board 22 are the same, and structures of the third pushing board 23 and the fourth pushing board 24 are the same. The third pushing board 23 is sized larger than the first pushing board 21 so that the third pushing board 23 has a large contact area for contact with the objects 7. The driving member 42 protrudes beyond the third pushing board 23 in a longitudinal direction of the third pushing board 23.

Specifically, each of the first insertion columns 231 is sleeved by a first elastic ring 232. The first elastic ring 232 is disposed between one of the first insertion columns 231 and an inner wall of one of the first insertion holes 211 when each of the first insertion columns 231 are inserted into one of the first insertion holes 211. The first elastic ring 232 improves connection between each of the first insertion columns 231 and one of the first insertion holes 211 so that they are not easy to loosen due to external force. Similarly, each of the second insertion columns 241 is sleeved by a second elastic ring 242. The second elastic ring 242 is disposed between one of the second insertion columns 241 and an inner wall of one of the second insertion holes 221 when each of the second insertion columns 241 is inserted into one of the second insertion holes 221. Furthermore, the first elastic ring 232 and the second elastic ring 242 may be made of rubber, silicone rubber or other elastic materials.

Moreover, the driving member 42 preferably further has a driving head 43. The driving head 43 and the pushing end 44 are located at two ends of the driving member 42 respectively. The driving head 43 is configured to be assembled with a rotatory tool so that the driving member 42 can be rotated easily and rapidly by the rotatory tool. Preferably, the pushing end 44 is cone-shaped, and the driving head 43 is a polygonal columnar.

Furthermore, the driving head 43 further has an assembling hole 431 radially disposed thereon. The assembling hole 431 is configured to be connected with a pin so that the driving member 42 is rotatable with the pin.

In summary, the widener of this invention is able to be inserted within a narrow space to push the two spaced and adjacent objects away from each other in parallel. In addition, the distance between the two objects is adjustable, and the pushing boards are detachable so that they can be replaced or varied according to actual use.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A widener, including:
a base, including an inner space, a first passage and a second passage, the first passage and the second passage being communicated with the inner space, the first passage being transverse to the second passage;
a pushing assembly, including a first pushing board, a second pushing board and a linkage member, the first pushing board being positioned at the base, the linkage member being movably inserted within the second passage, the second pushing board being movably connected with the linkage member, the second pushing board being located opposite to the first pushing board;
a driving assembly, including a tube body, a driving member and a driving block, the tube body defining a driving space, the driving block being movably received in the driving space, an end of the tube body being connected with the first passage and the driving space being communicated with the inner space, the driving member being movably screwed to and within another end of the tube body, a pushing end of the driving member being abutted against the driving block in the driving space;

wherein the driving block, the first passage, the inner space, the second passage and the linkage member define a flowing space which is configured to receive liquid;

wherein the base has a projection, the second passage is disposed through the projection and a first opening with a circular shape is formed, the linkage member has a head portion with a circular shape and a body portion, a diametric dimension of the head portion is larger than a diametric dimension of the body portion, a caliber of the first opening, a diametric dimension of the second passage and the diametric dimension of the head portion are the same; the pushing assembly further includes a restricting member which is positionably sleeved on the projection, the restricting member has a second opening with a non-circular shape, a contour of the second opening corresponds to a contour of the body portion, and the linkage member is movable along the second passage and non-rotatable relative to the second passage; a caliber of the second opening is smaller than the caliber of the first opening, and the restricting member interferes with the head portion in an opening direction of the first opening.

2. The widener of claim 1, wherein the linkage member has a threaded hole, the second pushing board includes a screwing portion protruding thereon, and the screwing portion is screwed with the threaded hole to connect the second pushing board and the linkage member.

3. The widener of claim 1, further including a first piston and a second piston, wherein the first piston is disposed on the driving block, the second piston is disposed on the linkage member, the first piston has a first receiving groove, an opening of the first receiving groove faces the inner space, the second piston has a second receiving groove, an opening of the second receiving groove faces the inner space, the first receiving groove and the second receiving groove are configured to receive the liquid.

4. A widener, including:
a base, including an inner space, a first passage and a second passage, the first passage and the second passage being communicated with the inner space, the first passage being transverse to the second passage;
a pushing assembly, including a first pushing board, a second pushing board and a linkage member, the first pushing board being positioned at the base, the linkage member being movably inserted within the second passage, the second pushing board being movably connected with the linkage member, the second pushing board being located opposite to the first pushing board;
a driving assembly, including a tube body, a driving member and a driving block, the tube body defining a driving space, the driving block being movably received in the driving space, an end of the tube body being connected with the first passage and the driving space being communicated with the inner space, the driving member being movably screwed to and within another end of the tube body, a pushing end of the driving member being abutted against the driving block in the driving space;

wherein the driving block, the first passage, the inner space, the second passage and the linkage member define a flowing space which is configured to receive liquid;

wherein the pushing assembly further includes a third pushing board and a fourth pushing board, the third pushing board is detachably disposed on the first pushing board, and the fourth pushing board is detachably disposed on the second pushing board;

wherein the first pushing board has a plurality of first insertion holes, the third pushing board has a plurality of first insertion columns, the plurality of first insertion columns are disposed within the plurality of first insertion holes respectively so that the third pushing board is connected to the first pushing board; the second pushing board has a plurality of second insertion holes, the fourth pushing board has a plurality of second insertion columns, the plurality of second insertion columns are disposed within the plurality of second insertion holes respectively so that the fourth pushing board is connected to the second pushing board;

wherein each of the first insertion columns is sleeved by a first elastic ring, the first elastic ring is disposed between one of the first insertion columns and an inner wall of one of the first insertion holes when each of the first insertion columns are disposed within one of the first insertion holes; each of the second insertion columns is sleeved by a second elastic ring, the second elastic ring is disposed between one of the second insertion columns and an inner wall of one of the second insertion holes when each the second insertion columns is disposed within one of the second insertion holes.

5. A widener, including:
a base, including an inner space, a first passage and a second passage, the first passage and the second passage being communicated with the inner space, the first passage being transverse to the second passage;
a pushing assembly, including a first pushing board, a second pushing board and a linkage member, the first pushing board being positioned at the base, the linkage member being movably inserted within the second passage, the second pushing board being movably connected with the linkage member, the second pushing board being located opposite to the first pushing board;
a driving assembly, including a tube body, a driving member and a driving block, the tube body defining a driving space, the driving block being movably received in the driving space, an end of the tube body being connected with the first passage and the driving space being communicated with the inner space, the driving member being movably screwed to and within another end of the tube body, a pushing end of the driving member being abutted against the driving block in the driving space;

wherein the driving block, the first passage, the inner space, the second passage and the linkage member define a flowing space which is configured to receive liquid;

wherein the driving member further has a driving head, the driving head and the pushing end are located at two ends of the driving member respectively, and the driving head is configured to be assembled with a rotary tool;

wherein the driving head has an assembling hole radially disposed therethrough, the assembling hole is configured to be connected with a pin, and the driving member is rotatable with the pin.

6. The widener of claim 5, wherein the linkage member has a threaded hole, the second pushing board includes a screwing portion protruding thereon, and the second pushing board is screwed with the threaded hole to connect the second pushing board and the linkage member; the base has a projection, the second passage is disposed through the projection and a first opening with a circular shape is formed, the linkage member has a head portion with the circular shape and a body portion with a non-circular shape, a diametric dimension of the head portion is larger than a diametric dimension of the body portion, a caliber of the first opening, a diametric dimension of the second passage and the diametric dimension of the head portion are the same; the pushing assembly further includes a restricting member which is positionably sleeved on the projection, the restricting member has a second opening with a non-circular shape, a contour of the second opening corresponds to the contour of the body portion, and the linkage member is movable along the second passage and be non-rotatable relative to the second passage; a caliber of the second opening is smaller than the caliber of the first opening, and the restricting member interferes with the head portion in an opening direction of the first opening; the widener further includes a first piston and a second piston, the first piston is disposed on the driving block, the second piston is disposed on the linkage member, the first piston has a first receiving groove, an opening of the first receiving groove faces the inner space, the second piston has a second receiving groove, an opening of the second receiving groove faces the inner space, the first receiving groove and the second receiving groove are configured to receive the liquid; the driving member further has a driving head, the driving head and the pushing end are located at two ends of the driving member respectively, and the driving head is configured to be assembled with a rotary tool; the first pushing board is detachably disposed on the base, dimensions of the first pushing board and the second pushing board are the same, dimensions of the third pushing board and the fourth pushing board are the same, the third pushing board is sized larger than the first pushing board; the driving member protrudes beyond the third pushing board in a longitudinal direction of the third pushing board; the pushing end is cone-shaped; the base is a rectangular cuboid; the contour of the second opening is oval-shaped; the threaded hole is disposed on the body portion.

* * * * *